(No Model.) 3 Sheets—Sheet 1.
T. W. MAYSON.
OPTICAL INSTRUMENT FOR MEASURING ANGLES OR DISTANCES.
No. 467,895. Patented Jan. 26, 1892.
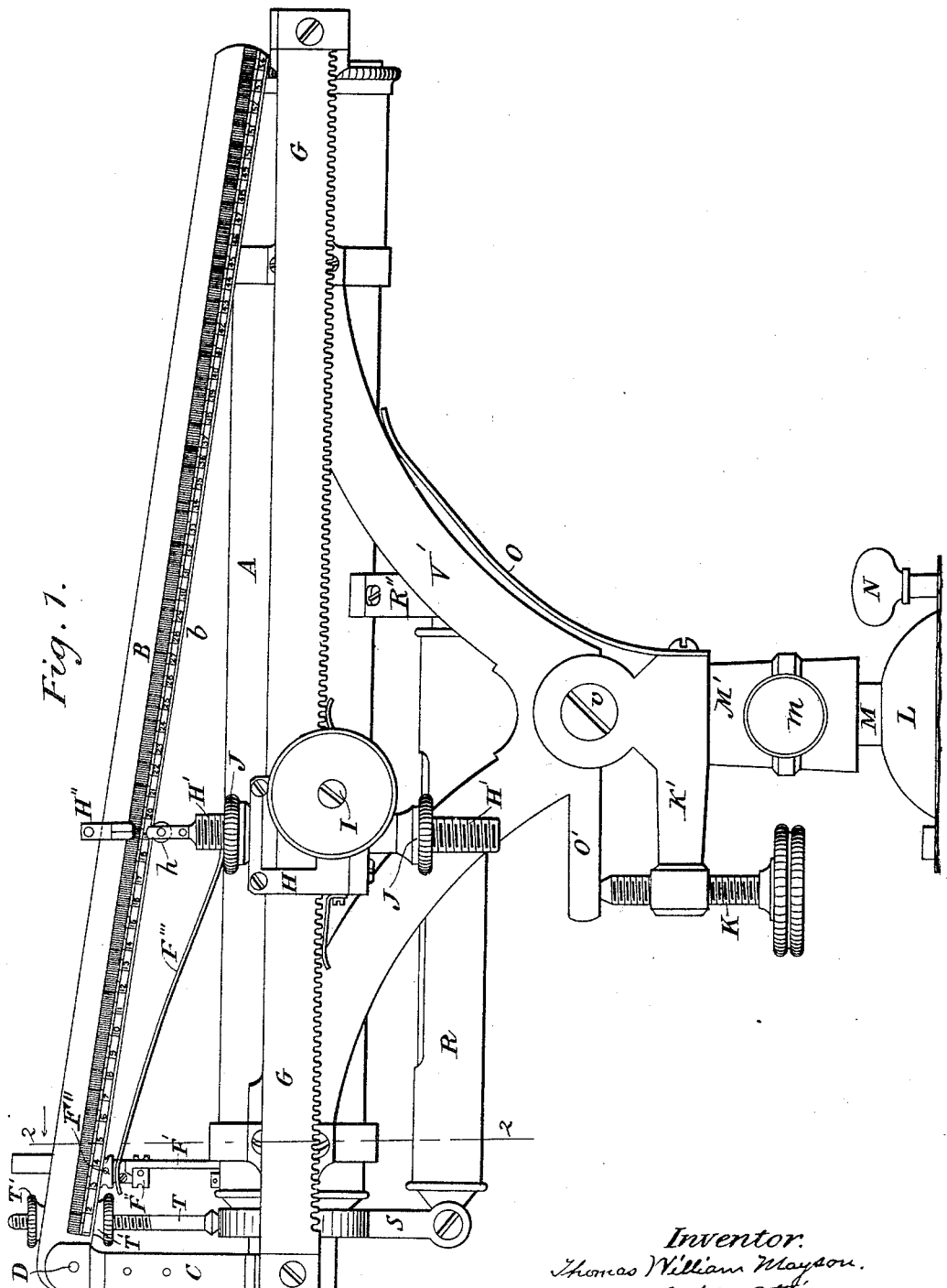

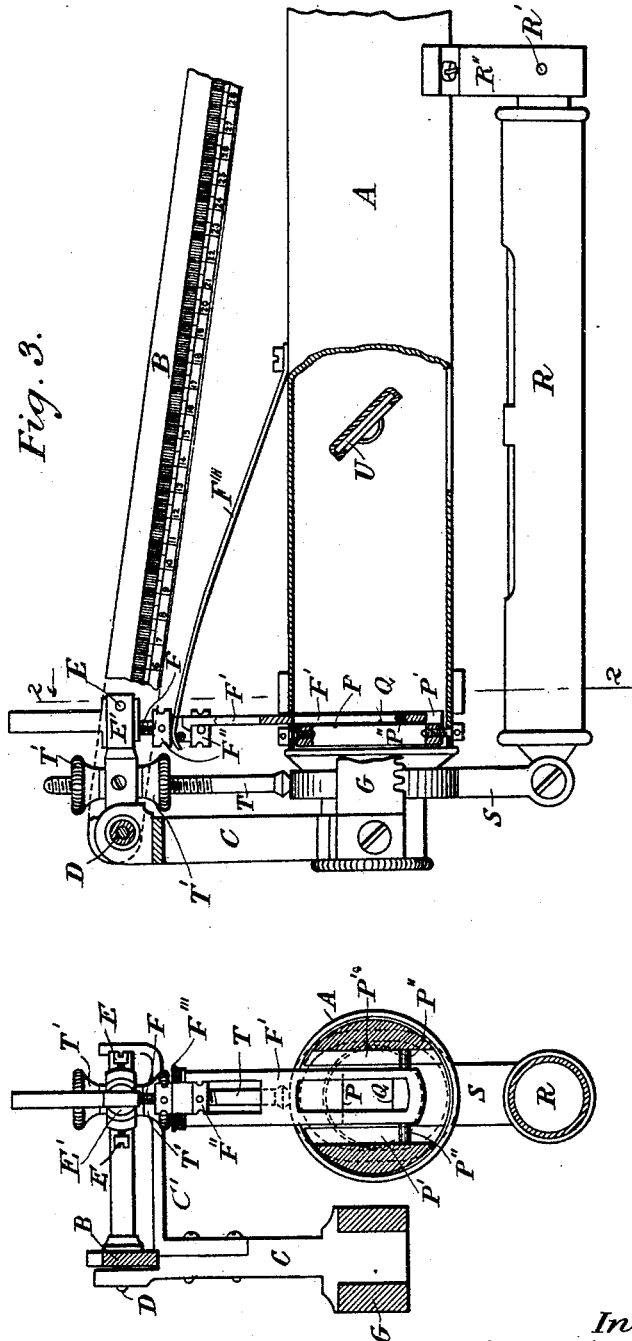

(No Model.) 3 Sheets—Sheet 3.
T. W. MAYSON.
OPTICAL INSTRUMENT FOR MEASURING ANGLES OR DISTANCES.
No. 467,895. Patented Jan. 26, 1892.
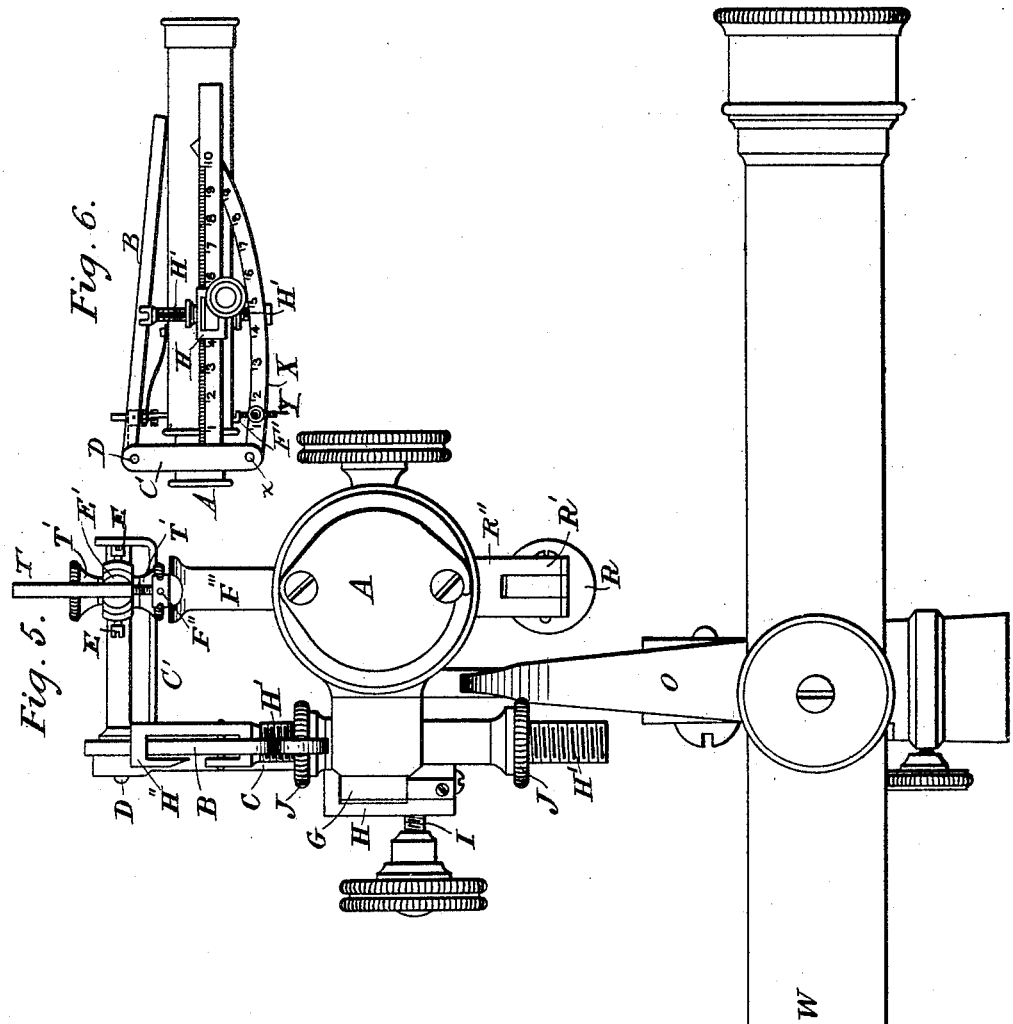
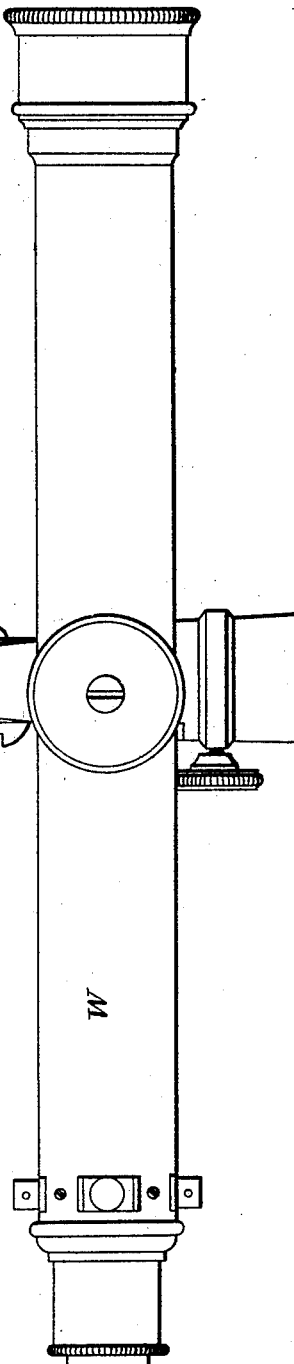
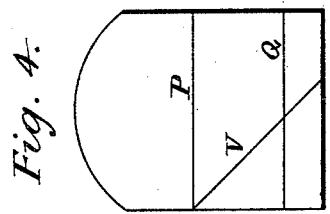
Witnesses.
Inventor.
Thomas William Mayson.
By his Atty's.

UNITED STATES PATENT OFFICE.

THOMAS WILLIAM MAYSON, OF PONSONBY, ASSIGNOR TO JAMES PALMER CAMPBELL, OF AUCKLAND, NEW ZEALAND.

OPTICAL INSTRUMENT FOR MEASURING ANGLES OR DISTANCES.

SPECIFICATION forming part of Letters Patent No. 467,895, dated January 26, 1892.

Application filed July 15, 1891. Serial No. 399,641. (No model.)

*To all whom it may concern:*

Be it known that I, THOMAS WILLIAM MAYSON, draftsman, a subject of the Queen of Great Britain, residing at Ponsonby, in the city of Auckland, New Zealand, have invented certain new and useful Improvements in Instruments for Measuring Angles or Distances, of which the following is a specification.

My invention relates to that well-known class of instruments for measuring angles known as "filar" or "wire" micrometers, in which the measurement is made by varying the distance between a fixed and a movable wire crossing the field of a telescope. The movable wire is usually actuated by a screw with a graduated circle on its head, a fixed index being provided to show the angle through which the head has been turned from the zero-point, this angle being proportional to the distance between the wires.

The object of my invention is to secure an improved instrument which shall be accurate, readily adjustable, effective, and adapted to various kinds of work, which ends I attain by substituting for the screw hereinbefore mentioned and heretofore employed a graduated beam, lever, or radius-bar actuating one of the cross-wires and turning on or around a pivot, upon or around which the beam is rocked or turned by means of a slide carrying an index which registers the distance traversed by it upon the scale, and consequently the angle to be measured.

My improvements consist in certain novel constructions, combinations, and organizations of instrumentalities hereinafter described and claimed. Some of these may be used without the others and in instruments differing to some extent in their details of construction from those hereinafter specified. Unless otherwise indicated the parts are of usual approved construction.

The accompanying drawings show so much of various forms of the apparatus as is necessary to illustrate the subject-matter claimed.

Figures 1, 2, and 3 show an instrument adapted for general use upon land or sea, in the latter case the stand and supporting-frame being omitted. Fig. 1 represents a side elevation of the machine; Fig. 2, a vertical cross-section on the line 2 2 of Figs. 1 and 3, looking toward the object-glass or cross-wire end of the instrument, and Fig. 3 an elevation, similar to Fig. 1, of the object-glass end of the instrument, partly in section, showing the details of the mechanism by which the adjustment of the movable cross-wire is effected. Figs. 4 and 5 show a modified form of the instrument adapting it to long-distance land-measurements. Fig. 4 shows an elevation of the cross-wires, and Fig. 5 an elevation of the machine as seen from the object-glass end. Fig. 6 represents a side elevation of a portion of the instrument, showing a modification adapted for sighting guns.

The drawings show the usual theodolite telescope A, firmly secured in a supporting-frame V'. An upright standard or support C, mounted on the frame, projects above it. The end of a beam, lever, or radius-bar B, provided with a graduated scale b, is connected with the upright C by means of a pivot D, which may be made adjustable vertically therein in well-known ways. This scale-beam is free to turn vertically around the pivot to a limited extent.

The lower end of a screw-rod F, extending vertically through a gimbal-block E', rocking on pivots E on an arm or bracket C', projecting laterally over the telescope from the supporting-standard C, passes through the top of a slide-frame F', the height of which or its relation to the axis of the telescope can be varied by means of jam-nuts F'' F'' on the screw and above and below the top of the slide-frame. A bearing-spring F''' presses on the top of the slide-frame to retain it in a correct position. Guide-pins P'' on the diaphragm P' of the telescope fit into vertical slots in the slide-frame. The diaphragm also carries a fixed cross-wire P inside the telescope, and the slide-frame also carries a parallel cross-wire Q.

A rack G, carried by the supporting-frame on one side of and parallel with the telescope, is traversed longitudinally by an index-slide H, actuated by a pinion I, carried thereby and gearing with the rack. A screw H', passing vertically through the slide H, carries a fork H'', embracing the scale-beam B, or in which the latter lies upon a friction-roller $h$. The length of this screw, or its projection above the rack, may be varied to adjust the reading of the instrument by means of nuts J J above and below the slide.

The supporting-frame V' rocks vertically on a pivot $v$ and may be elevated and depressed by means of a set-screw K, passing through a bracket K' on a post M' and acting on an arm O', projecting from the rocking supporting-frame V'. A plate-spring O on the opposite side of the pivot $v$ presses the arm O' against the head of the screw K to keep the instrument steady.

The post M' turns horizontally on a vertical axis M, supported by a ball-and-socket joint L. A screw $m$ clamps the post M' on its axis and keeps it at the desired angle, while a corresponding clamp-screw N clamps the socket on the ball L to hold the axis or post M at the inclination desired.

The front end of a spirit-level R is connected by a pivot R' with a bracket R'', depending from the telescope, while its rear end is pivoted to a supporting-link S, encircling the telescope, and connected by a screw T and jam-nuts T' to the scale-beam B. This spirit-level is read by means of a mirror U, Fig. 3, set at a suitable angle inside the telescope. The spirit-level R and its appurtenant parts may be omitted when measuring distance on land.

In such an instrument the object whose angular size, as seen by the observer, is to be measured is viewed from a fixed point behind the wires—that is, the eye-piece of the telescope. The instrument is so adjusted that the fixed wire touches one side of the object to be measured—say the top—while the movable wire is so adjusted that it touches or coincides with the opposite side of the object—say the bottom. The distance between the observer's eye and the cross-wires being constant, the angle subtended by the object evidently will be proportional to the distance between the wires. The scale-beam necessarily turns on its pivot coincidently with the adjustment of the movable wire, and as this adjustment is effected by the index-slide on which the scale-beam rests the travel of the movable wire is for small movements practically proportional to the distance traversed by the index-slide, which distances are read by the graduation on the scale-beam, as is well understood. The meaning or value of the graduation depends upon the manner of adjusting and using the instrument. Thus if the movable wire Q be below the fixed wire P, as shown in the drawings, then the lifting of the scale-beam diminishes the space between the wires and the instrument measures the distance of an object of known height, the exact value of the graduations depending on the distance of the observer's eye from the wires, which is determined by the nature of the telescope employed and by the height of object of known height observed. If, for instance, the organization be such that the distance of a rod one foot high is shown in feet, the distance of rod one yard high will be shown in yards, and so on. Again, if the movable wire Q be placed above the fixed wire P, which can be done by means of the screw T, acting on the slide-frame, then as the scale-beam is raised the space between the wires increases and the instrument will measure angles, as before, the value of the graduations depending on the nature of the telescope employed.

For use at sea the instrument, being provided with a level parallel to the line of sight, as above described, is raised or lowered until the fixed wire is on a line with the water-level of the object, vessel, or fort. Then the slide is moved until the level is seen by the aid of the mirror or reflector to be level, the distance of the object being then indicated on the lever or beam. The level is only required where the horizon cannot be seen. When the horizon is visible, the slide is moved until the movable wire is on a line with the horizon. Further, by the addition of the level the elevation, as well as the distance of an object of known height, may be read, thus saving much time in surveying. These methods of reading are well known to those skilled in the art.

Figs. 4 and 5 show a modified form of instrument adapted for measuring long distances on land, like parts in these figures being lettered correspondingly with the preceding ones. In this modification I employ a second telescope W, fixed at right angles to the principal telescope A and supplied with suitable cross-wires. In this case I also employ an additional wire V, fixed in the diaphragm at an angle of forty-five degrees with the cross-wires P Q. The second telescope, like the first, is adjustable in both vertical and horizontal planes.

The method of using this modified form of instrument is as follows: The object to be measured is made to coincide with the point of intersection of the fixed wire P and the diagonal wire V. An object at right angles, or nearly so, to the line of sight is then observed through the second telescope W. Then the instrument is set up at a given distance—say twenty or thirty paces—on such bearing, the cross-wire of the second telescope being placed so as to fall upon the base-line. The object is then again observed through the measuring-telescope A. The object whose distance is to be measured will be seen at some distance, apparently to one side of its former position. Next, by means of the elevating and depressing screw K, the instrument is raised until the object touches the diagonal wire V. Finally, the movable wire Q is raised until it cuts the object on the diagonal wire V, and the distance will then be shown on the indicator.

Fig. 6 represents a modification of the instrument adapting it for sighting guns. This instrument has two moving wires, the additional wire being used as a sight, and two scale-beams, the additional one X being connected by a pivot $x$ to the standard C, curved according to the trajectory of the gun and connected with the slide-frame F' by a screw Y. This lever is also traversed and controlled by the same slide H that actuates the other scale-beam. Consequently the act of adjusting the instrument to read the angle subtended by an object of known height raises or lowers the additional cross-wire to the correct elevation for sighting the gun. The operation of this form of the instrument will readily be understood from the foregoing description. This figure also shows the graduations as marked on the rack, instead of on the scale-beam, and they may be so marked in all the various forms of the instrument shown or the graduation might be marked on the telescope itself.

Having now particularly described the construction, organization, and operation of my improved instrument for measuring angles, what I claim therein as new and as of my own invention is—

1. The combination, substantially as hereinbefore set forth, of a telescope, a fixed cross-wire therein, a pivoted beam, a movable cross-wire actuated thereby, and means for measuring the angle between the axis of the telescope and the beam.

2. The combination, substantially as hereinbefore set forth, of a telescope, a fixed cross-wire therein, a movable cross-wire, a pivoted beam actuating it, a slide actuating the beam, and a graduated scale for measuring the angle of the beam.

3. The combination, substantially as hereinbefore set forth, of a telescope, its fixed cross-wire, a movable cross-wire, a pivoted beam actuating it, appliances for measuring the angle between the axis of the telescope and the beam and for varying such angle, a mirror in the telescope, and a spirit-level adjustable with the beam and adapted to be read by the mirror.

4. The combination, substantially as hereinbefore set forth, of a telescope, a fixed cross-wire therein, movable cross-wires, independently-pivoted beams actuating them, and appliances for varying the angle of these beams, respectively, to the axis of the telescope and for measuring such variations.

5. The combination, substantially as hereinbefore set forth, of a supporting-frame, a telescope mounted therein, a beam pivoted to the frame, an index-slide actuating it to vary its angle relatively to the axis of the telescope, and a cross-wire slide movable transversely to said axis and suspended from said beam.

6. The combination, substantially as hereinbefore set forth, of a supporting-frame, a telescope mounted therein, a beam pivoted to the frame, an index-slide actuating it to vary the angle of the beam relatively to the axis of the telescope, a cross-wire slide suspended from the beam and movable coincidently therewith transversely to said axis, and a spirit-level also suspended from the beam and adjustable coincidently with it and with the slide, for the purposes specified.

THOMAS WILLIAM MAYSON.

Witnesses:
R. W. RUSSELL,
*Solicitor, Auckland, N. Zealand.*
CHARLES BROWNE,
*Solicitor's Clerk, Auckland, N. Z.*